US007640629B2

(12) United States Patent
Kim

(10) Patent No.: US 7,640,629 B2
(45) Date of Patent: Jan. 5, 2010

(54) MOBILE TERMINAL

(75) Inventor: Sang-Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 11/940,962

(22) Filed: Nov. 15, 2007

(65) Prior Publication Data
US 2008/0115326 A1    May 22, 2008

(30) Foreign Application Priority Data
Nov. 17, 2006    (KR)    ...... 10-2006-0114143

(51) Int. Cl.
*E05D 3/10* (2006.01)
(52) U.S. Cl. ............... 16/367; 16/277; 16/224
(58) Field of Classification Search ........... 16/367, 16/24, 224; 455/575.4; 379/433.12, 433.13; 361/681
See application file for complete search history.

(56) References Cited

U.S. PATENT DOCUMENTS

| | | | |
|---|---|---|---|
| 6,985,579 B2 * | 1/2006 | Abood et al. | 379/433.13 |
| 2004/0121825 A1 * | 6/2004 | Ma et al. | 455/575.4 |
| 2006/0046797 A1 * | 3/2006 | Chen | 455/575.4 |
| 2007/0271733 A1 * | 11/2007 | Abe et al. | 16/225 |
| 2008/0318645 A1 * | 12/2008 | Takamori et al. | 455/575.4 |
| 2009/0036179 A1 * | 2/2009 | Chiou et al. | 455/575.4 |

* cited by examiner

*Primary Examiner*—Victor Batson
*Assistant Examiner*—Matthew Sullivan
(74) *Attorney, Agent, or Firm*—Birch, Stewart, Kolasch & Birch, LLP

(57) ABSTRACT

A mobile terminal including a first body, a second body having a display unit and arranged to overlap the first body in a closed state, and a hinge module connecting the second body to the first body such that the second body is rotatable around a first axis generally perpendicular to the first body. The hinge module being configured to allow a portion of the second body to be elevated so as to be slantingly arranged with respect to the first body in an open state.

16 Claims, 8 Drawing Sheets

MOBILE TERMINAL

CROSS-REFERENCE TO RELATED APPLICATIONS

This application claims priority to Korean Application No. 10-2006-0114143, filed Nov. 17, 2006, and is herein incorporated by reference.

BACKGROUND OF THE INVENTION

1. Field of the Invention

The present invention relates generally to a mobile terminal, and more particularly, a mobile terminal having one body with a display that is rotatable with respect to another body between opened and closed states and the body with the display is moveable to a slanting position with respect to the other body.

2. Description of Related Art

A related art mobile terminal is one of many portable electronic devices that allow the user to wirelessly transmit/receive information or read/process information while on the move. Recently, owing to the development of information technology, communication technology, and memory technology, the mobile terminal can directly create multimedia and transmit/receive multimedia, in addition to its basic call functions. For example, the mobile terminal can allow the user to capture an image or video, send an image or video, and/or enjoy an image or video by using a digital camera mounted therein, reproduce a multimedia file such as music, movies or games, or receive digital multimedia broadcasting (DMB) using satellite communication or terrestrial waves.

Accordingly, the mechanical configuration of the related art mobile terminal has been changed to a structure that allows convenient use of the display unit. For example, although the conventional display unit is usually embodied as a vertical screen orientation, some display units are embodied in a horizontal screen orientation to allow more convenient viewing of broadcasts or video.

However, the related art mobile terminal has the following problems. That is, a body portion having the display unit with a screen mounted in a vertical orientation can be rotated in a planar manner such that the screen is in a horizontal orientation to allow the user to watch images on a wider screen, but such planar rotation fails to provide a desired viewing angle for the user to watch the images more conveniently.

In addition, in order to obtain a desired viewing angle, the user needs to either use a device, such as a stand, cradle, or other support, to lean the entire mobile terminal thereon, which requires some space on which the stand should be placed and is thus cumbersome and inconvenient.

BRIEF SUMMARY OF THE INVENTION

Therefore, in order to address the above matters the various features described herein have been conceived. One aspect of the exemplary embodiments is to provide a mobile terminal having a display unit that is capable of providing a desired viewing angle that is convenient for the user to watch an image in a viewing mode.

Another aspect of the exemplary embodiments is to provide a mobile terminal having a display unit allowing a tilt angle to be automatically made while the display unit is rotated from a vertical orientation to a horizontal orientation, thus removing the necessity of a cradle.

According to principles of this invention, a mobile terminal is provided that includes a first body, a second body having a display unit and arranged to overlap the first body in a closed state, and a hinge module connecting the second body to the first body such that the second body is rotatable around a first axis generally perpendicular to the first body. The hinge module being configured to allow a portion of the second body to be elevated so as to be slantingly arranged with respect to the first body in an open state.

According to another aspect, the hinge module may be configured to allow the portion of the second body to be elevated while the second body is partially rotated around the first axis.

According to a further aspect, the hinge module may include a first hinge portion formed on one of a front surface of the first body and a rear surface of the second body, the first hinge portion may include a slide face having a height that gradually increases so as to elevate the second body as the second body is rotated around the first axis from the closed state to the open state. A second hinge portion may be formed on the other of the front surface of the first body and the rear surface of the second body, where the second hinge portion is in slidably movable contact with the slide face of the first hinge portion. A supporting portion connects the first and second hinge portions.

According to yet a further aspect, the slide face of the first hinge portion may include a planar portion formed to be generally parallel to the first body, and a slope portion extending from the planar portion and having the gradually increasing height.

According to a different aspect, the first hinge portion may be formed to have a fan-like shape.

According to still another aspect, the supporting portion may include a supporting recess formed at one portion of one of the first hinge portion and the second hinge portion, and a supporting projection formed at the other of the first hinge portion and the second hinge portion, the supporting projection being received in the supporting recess. The supporting recess may be substantially hemispherical and the supporting projection may be substantially spherical.

According to another aspect, the hinge module may include a release preventing portion that prevents the first hinge portion from being released from the second hinge portion. The release preventing portion may include a release preventing rail having a groove formed at one surface of the first hinge portion, and a connecting portion mounted at one end of the second hinge portion, the connecting portion being received in the release preventing rail. The connecting portion may include a body extending from one end of the second hinge portion, and a protrusion extending from the body, the protrusion being slidably inserted into the release preventing rail.

According to yet another aspect, the hinge module may include an elastic force member that provides an elastic force to assist in the rotational movement of the second hinge portion from the closed state to the open state. The elastic force member may include an elastic unit located at one surface of the second hinge portion, where the elastic unit is elastically extendable in a lengthwise direction of the second hinge portion, a transfer unit connected at one end of the elastic unit, where the transfer unit is linearly moveable by being connected to the first hinge portion, and a guide rail recessed in one surface of the first hinge portion, the guide rail receiving the transfer unit therein to guide the transfer unit.

According to a further aspect, the elastic unit may include a fixed member extending from the one surface of the second hinge portion, a first shaft extending from one side of the fixed member in a lengthwise direction of the second hinge portion, a first elastic member located at one end of the first shaft to provide an elastic force to the rotation of the second hinge portion, and a first guide member covering the first elastic member and configured to guide an elastic movement of the first elastic member.

According to a different aspect, the transfer unit may include a second shaft extending toward the first hinge portion, a second guide member connected at an end of the second shaft distal to the second hinge portion, the guide member being displaceable along an axis defined by the second shaft as the second body is elevated, and a transfer member located at one end of the second guide member, where the transfer member is at least partially received in the guide rail. The transfer unit may further include a second elastic member connected between the distal end of the second shaft and the transfer member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a portion of this specification, illustrate embodiments of the invention and together with the description serve to explain the principles of the invention, In the drawings.

DETAILED DESCRIPTION OF THE INVENTION

The mobile terminal according to the exemplary embodiment of the present invention will now be described with reference to the accompanying drawings. While only one exemplary embodiment is shown it is understood that the present invention may be implemented in many different mobile terminals.

Figure 1:
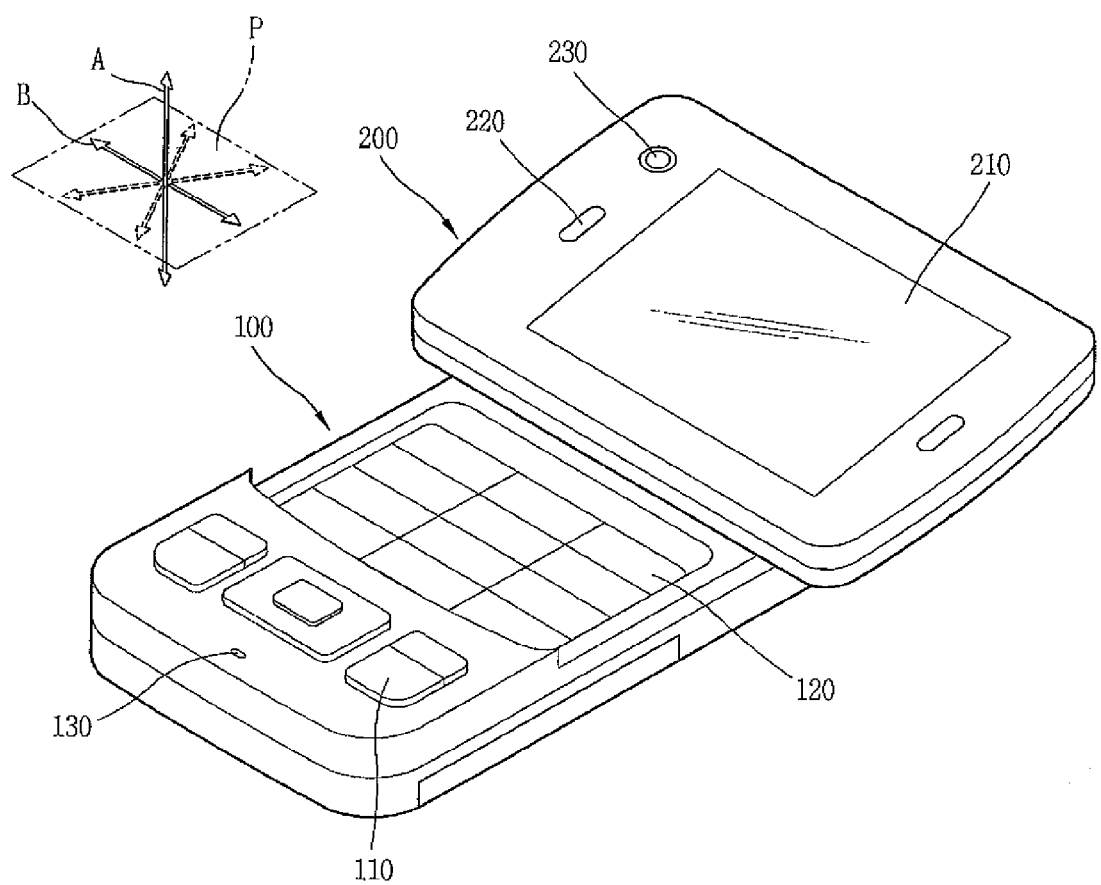
FIG. 1 is a perspective view of a mobile terminal according to an exemplary embodiment of the present invention.
Figure 2:
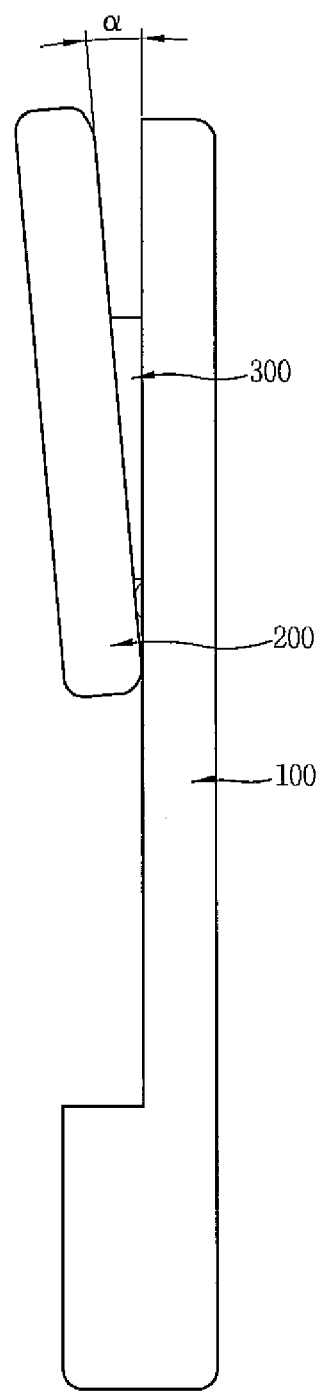
FIG. 2 is a side view of the mobile terminal of FIG. 1.

As shown in FIGS. 1 and 2, the mobile terminal according to the exemplary embodiment includes a first body 100, a second body 200, and a hinge module 300 (FIG. 2) that connects the first and second bodies 100 and 200 such that they are rotatable with respect to each other. For inputting information such as numbers or characters or a command, the first body 100 includes input devices 110 and 120 in the form of keypads, although other input devices could be used, mounted thereon. An upper surface of the first body 100 may be divided into a region which is always exposed and a region which is opened and closed according to a rotation of the second body 200. In this exemplary embodiment, the first input device 110 may be installed on the exposed region while the second input device 120 may be installed on the region that is opened and closed by the second body 200. The first input device 110 is accessed by the user no matter whether the second body 200 is rotated to be opened or not, and the second input device 120 is selectively accessible when the second body 200 is opened. Through a microphone 130 disposed adjacent to the input device 110, the user's voice can be inputted during call communication with another person.

Figure 5:
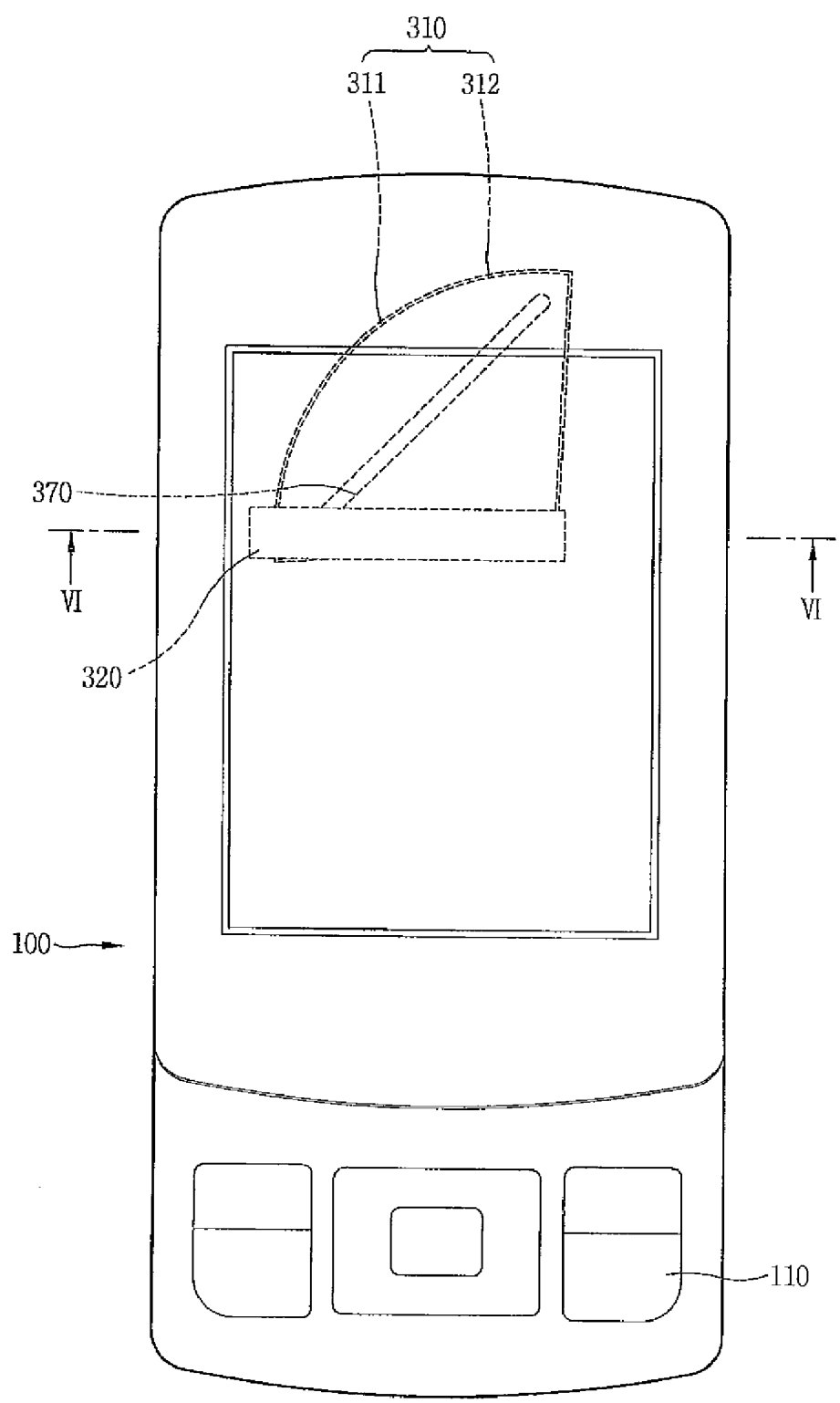
FIG. 5 is a schematic front view showing a closed state of the mobile terminal of FIG. 1.

A display unit 210 is located at a main or front surface of the second body 200 and outputs visual information. When the second body 200 is at a closed position with respect to the first body 100 (FIG. 5), the second body 200 provides a vertical screen, and when the second body 200 is rotated by about 90° with respect to the first body 100 to be at an opened position (FIG. 1), the display unit 210 provides a horizontal screen. Because the screen image outputted by the display unit 210 varies according to the position of the second body 200 with respect to the first body 100, the user can conveniently watch the screen image. A receiver or a speaker 220 that outputs a voice of another person during a call function or sound associated with an image or video displayed by the display unit may be located at the side of the display unit 210. A camera 230 may be disposed to be adjacent to the display unit 210 to receive an image or the like of the user. In this case, the image may be stored in the mobile terminal or may be sent to the other person for a video call or the like.

As shown in FIGS. 1 and 2, the hinge module 300 connects the second body 200 to the first body 100 such that the second body 200 is rotatable around a first axis (A) perpendicular to the first body 100. Also, the hinge module 300 allows the second body 200 to be elevated so as to be slantingly disposed with respect to the first body when rotated from a closed state to an open state (FIG. 1). For example, as the second body 200 is rotated about the first axis (A) the second body is also rotatable about a second axis (B). As shown in FIG. 1, the second axis (B) rotates about the first axis (A) as the second body 200 is rotated. In particular, the second body may first rotate substantially parallel to the first body 100 and then, while continuing to rotate about the first axis (A) begin to rotate about the second axis (B). In such an opened state, the second axis (B) is substantially parallel to a lengthwise direction of the second body 200 horizontally disposed on a planar surface (P) of the first body 100. In other words, as the second body 200 is rotated, the second axis (B) is rotated together centering around the first axis (A) on the planar surface (P). During the rotation, the second axis (B) is maintained to be substantially perpendicular to the first axis (A).

Figure 3:
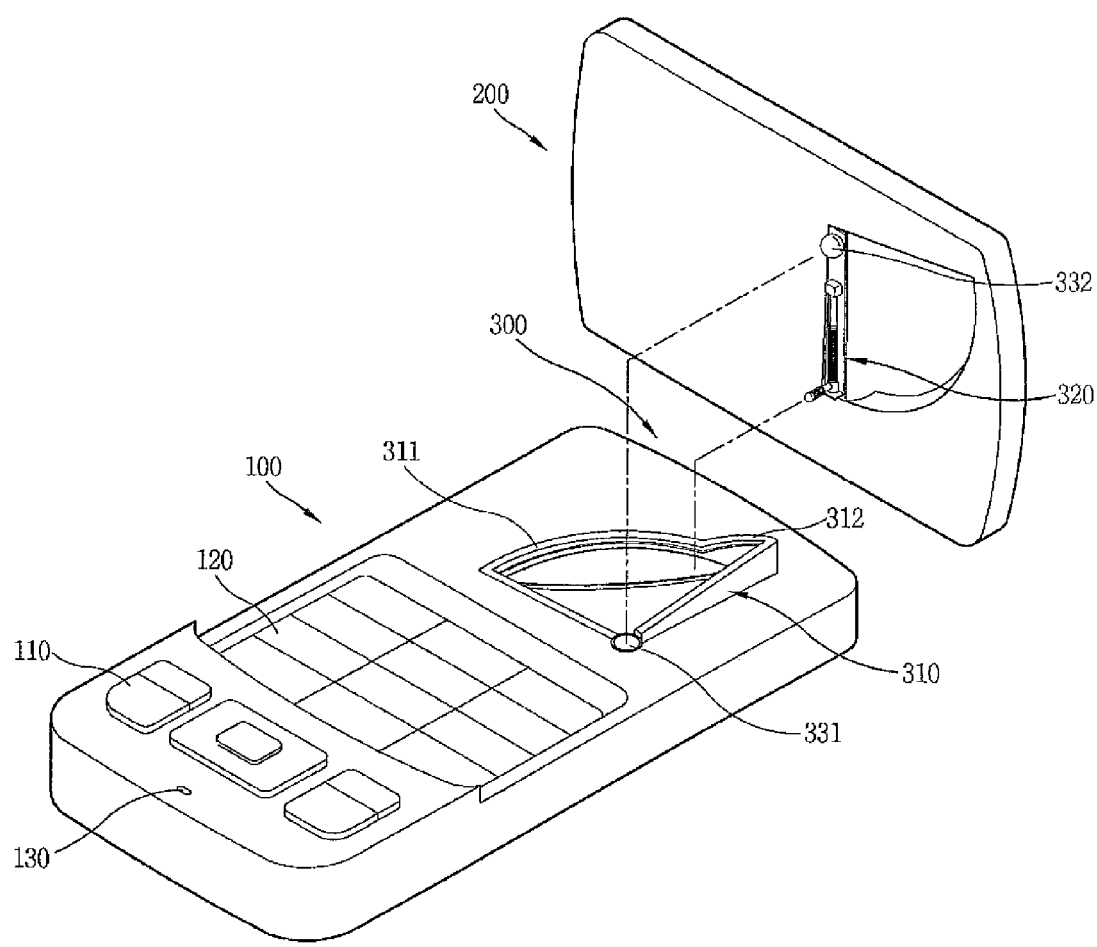
FIG. 3 is an exploded perspective view of the mobile terminal of FIG. 3.
Figure 4:
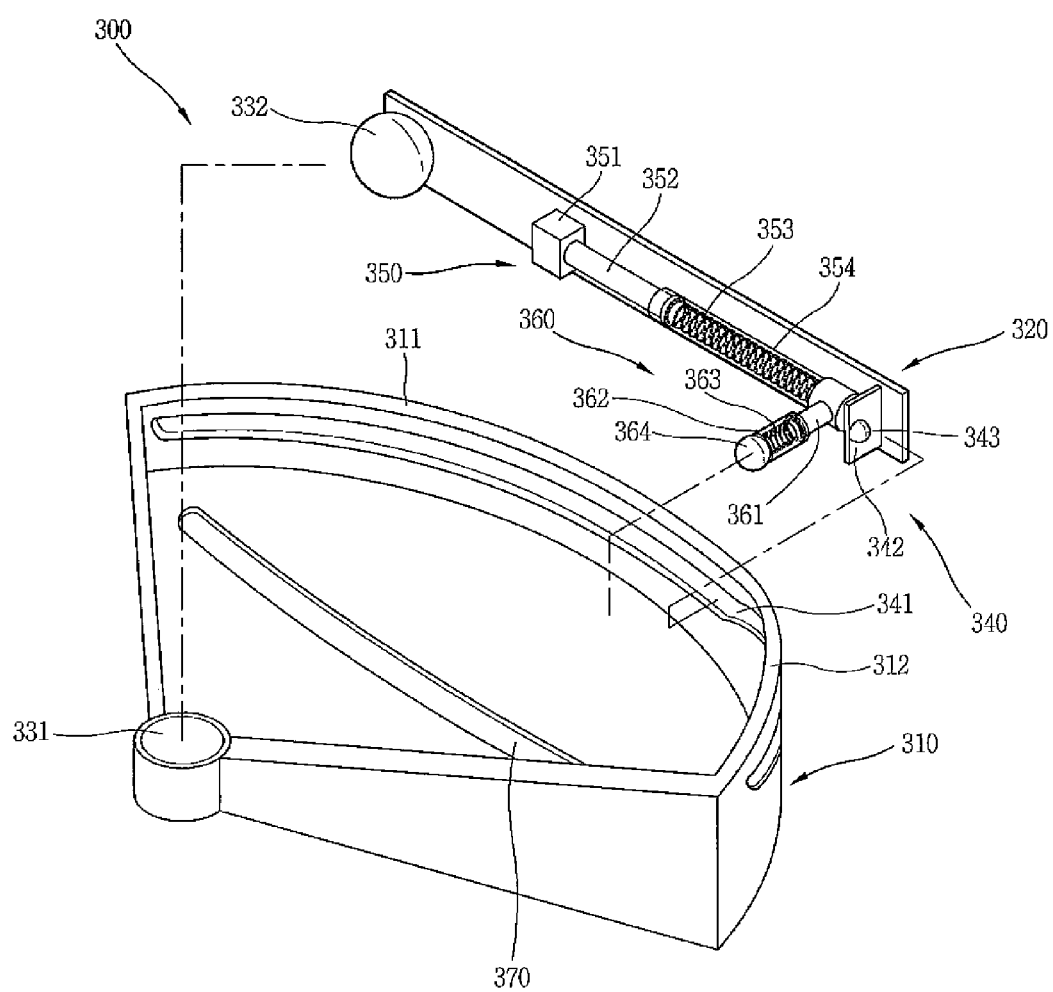
FIG. 4 is a perspective view of a hinge module according to the exemplary embodiment of the present invention.

Through the hinge module 300, the second body 200 is connected to the first body 100, and after the second body 200 is horizontally rotated at a certain angle relatively with respect to the first body 100, it is rotated while being stood at a tilt angle. In this manner, the second body 200 is rotated by approximately 90° with respect to the first body 100 and when it reaches the opened position, it is slantingly stood to provide a tilt angle or a viewing angle (a) suitable for the user to watch an image through the display unit 210. Further details of the hinge module 300 will be described with reference to FIGS. 3 and 4.

The hinge module 300 includes a first hinge portion 310, a second hinge portion 320, and a supporting portion. The first hinge portion 310 is located on the front surface of the first body 100. The first hinge portion 310 includes slide faces 311 and 312 where the height is gradually increased as it goes from an edge portion in the direction in which the second body 200 is rotated from the closed state to the open state. Specifically, the slide faces 311 and 312 define a planar portion formed to be substantially parallel to the front surface of the first body 100 and a slope portion extending from the slide face 311 and having a certain height increased as it goes upward, respectively. The second hinge portion 320 is located on the second body 200 and is slidably moved by contacting the slide faces 311 and 312 of the first hinge portion 310. The supporting portion may be formed at the first and second hinge portions 310 and 320 in order to support such that the second body 200 is relatively rotated with respect to the first body 100. While the first hinge portion 310 and the second hinge portion 320 have been described as being located on the first body 100 and the second body 200, respectively, it is understood that the locations of the first hinge portion 310 and the second hinge portion 320 may be switched.

The first hinge portion 310 may be formed to be recessed in a fan-like shape such that the planar portion 311 may be flush with the front surface of the first body 100. The second hinge portion 320 may be formed to be planar with the second body 200 and rotatable by contacting the slide faces 311 and 312 of the first hinge portion 310. The second hinge portion 320 is rotated substantially horizontally with respect to the first body 100 at the planar portion 311, and rotated to be stood at the tilt angle ($\alpha$) with respect to the first body 100 at the slope portion 312.

The supporting portion includes a supporting recess 331 located at one portion of the first hinge portion 310, and a supporting projection 332 formed at one portion of the second hinge portion 320 so as to be combined in or inserted into the supporting recess 331. As shown in the exemplary embodiment, the supporting recess 331 may have a hemispherical shape and the supporting projection 332 may have a spherical shape. Because the supporting projection 332 is inserted in the supporting recess 331, the second hinge portion 320 is rotatable such that it may be inclined while being rotated with respect to the first hinge portion 310.

A release preventing portion 340 may be formed between the first and second hinge portions 310 and 320 in order to prevent the first and second hinge portions 310 and 320 from being released after being combined. In particular, the release preventing portion 340 may include a release preventing rail 341 formed as a groove at one surface of the first hinge portion 310 and a connecting portion formed at one end of the second hinge portion 320 and insertable into the release preventing rail 341. The connecting portion may include a body 342 extending from one end of the second hinge portion 320 and a protrusion 343 extending from the body 342 to be received in the release preventing rail 341.

The connecting portion is combined with the release preventing rail 341 so that the second hinge portion 320 is moveable in a state that a lower surface of the second hinge portion 320 contacts with the slide faces 311 and 312 of the first hinge portion 310. To maintain this contact, a gap between the release preventing rail 341 and the slide faces 311 and 312 of the first hinge portion 310 is uniformly maintained and is the same as a gap between the protrusion 343 and the second hinge portion 320. Consequently, the release preventing rail has a portion that is substantially parallel to the planar portion 311 and a portion that is substantially parallel to the slope portion 312.

An elastic force member may be located at the first and second hinge portions 310 and 320 in order to provide an elastic force to assist in the rotational movement of the second hinge portion 320 and fix or maintain a state after the second hinge portion 320 is rotated.

The elastic force member may include an elastic unit 350 located on one surface of the second hinge portion 320 and is elastically extendable in a lengthwise direction of the second hinge portion 320, a transfer unit 360 connected at one end of the elastic unit 350 and is linearly moveable by being connected to the first hinge portion 310, and a guide rail 370 recessed in the form of a groove on one surface of the first hinge portion 310. The guide rail 370 is configured to receive the transfer unit 360 therein and to guide the transfer unit 360 therealong.

The elastic unit 350 may include a fixed member 351 extending from one surface of the second hinge portion 320, a first shaft 352 extending from one side of the fixed member 351 in a lengthwise direction of the second hinge portion 320, a first elastic member 353 located at one end of the first shaft 352 to provide an elastic force to the rotation of the second hinge portion 320, and a first guide member 354 coveting the first elastic member 353 and configured to guide an elastic movement of the first elastic member 353. The first shaft 352 serves as a guide when the first elastic member 353 is elastically moved and accordingly the first guide member 354 is linearly moved in a state of covering the first elastic member 353. The first guide member 354 is linearly moved based on the first shaft 352, and the transfer unit 360 is mounted at one end of the first guide member 354.

In particular, the first elastic member 353 operates as follows. When the fixed member 351 is rotated while tracing a circular arc according to the rotation of the second hinge portion 320, the transfer unit 360 is linearly moved. In this case, the distance between the fixed member 351 and the transfer member 364 changes, and the first elastic member 353 acts to elastically control the change in the distance. And at this time, the second body 200 is semi-automatically opened by virtue of a restoration force at a middle position of the circular arc.

The transfer unit 360 includes a second shaft 361 extending towards the first hinge portion 310, a second guide member 362 connected at an end of the second shaft 361 distal the second hinge portion 320, a second elastic member 363 connected between the distal end of the second shaft 361 and a transfer member 364, the transfer member 364 being located at one end of the second guide member 362 and is at least partially received in the guide rail 370. The guide member is displaceable along an axis defined by the second shaft 361 as the second body 200 is elevated.

The second shaft 361 is located at the first guide member 354 of the elastic unit 350, and when the second guide member 362 is linearly moved up and down in a state of covering the second elastic member 363, the second shaft 361 serves as a guide.

The second guide member 362 serves to connect the second shaft 361 to the transfer member 364 such that the spacing between the second hinge 320 and the transfer member 364 is adjustable as the second hinge portion 320 is slantingly rotated along the slide faces 311 and 312 of the first hinge portion 310. In addition, the second elastic member 363 is guided by the second guide member 362 to provide a buffering force to the rotation of the second hinge portion 320.

As shown in the exemplary embodiment, the transfer member 364 is formed as a sphere and is partially inserted into the guide rail 370 to allow for linear movement. The guide rail 370 includes a groove linearly on one surface of the first hinge portion 310, to which the transfer member 364 of the transfer unit 360 is combined or inserted into. When the second hinge portion 320 is rotated, the transfer member 364 is moved along the guide rail 370.

Figure 6:
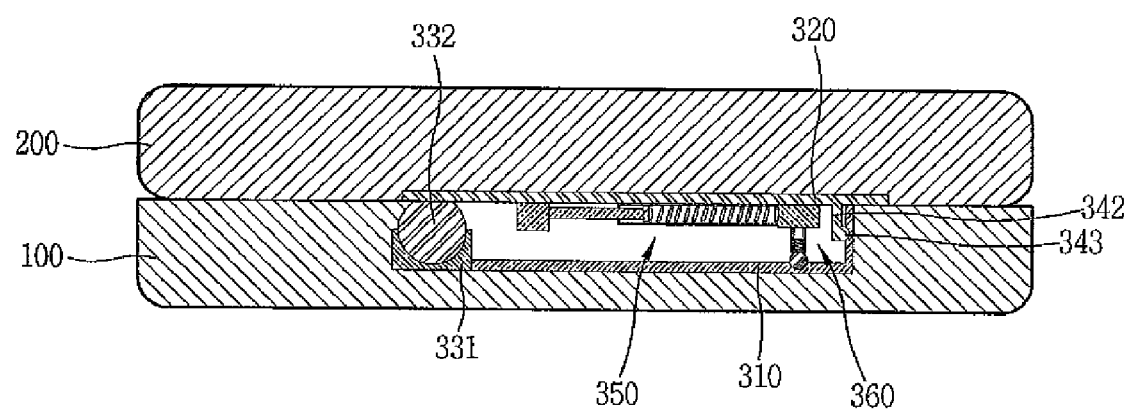
FIG. 6 is a sectional view taken along line VI-VI in FIG. 5.
Figure 7:
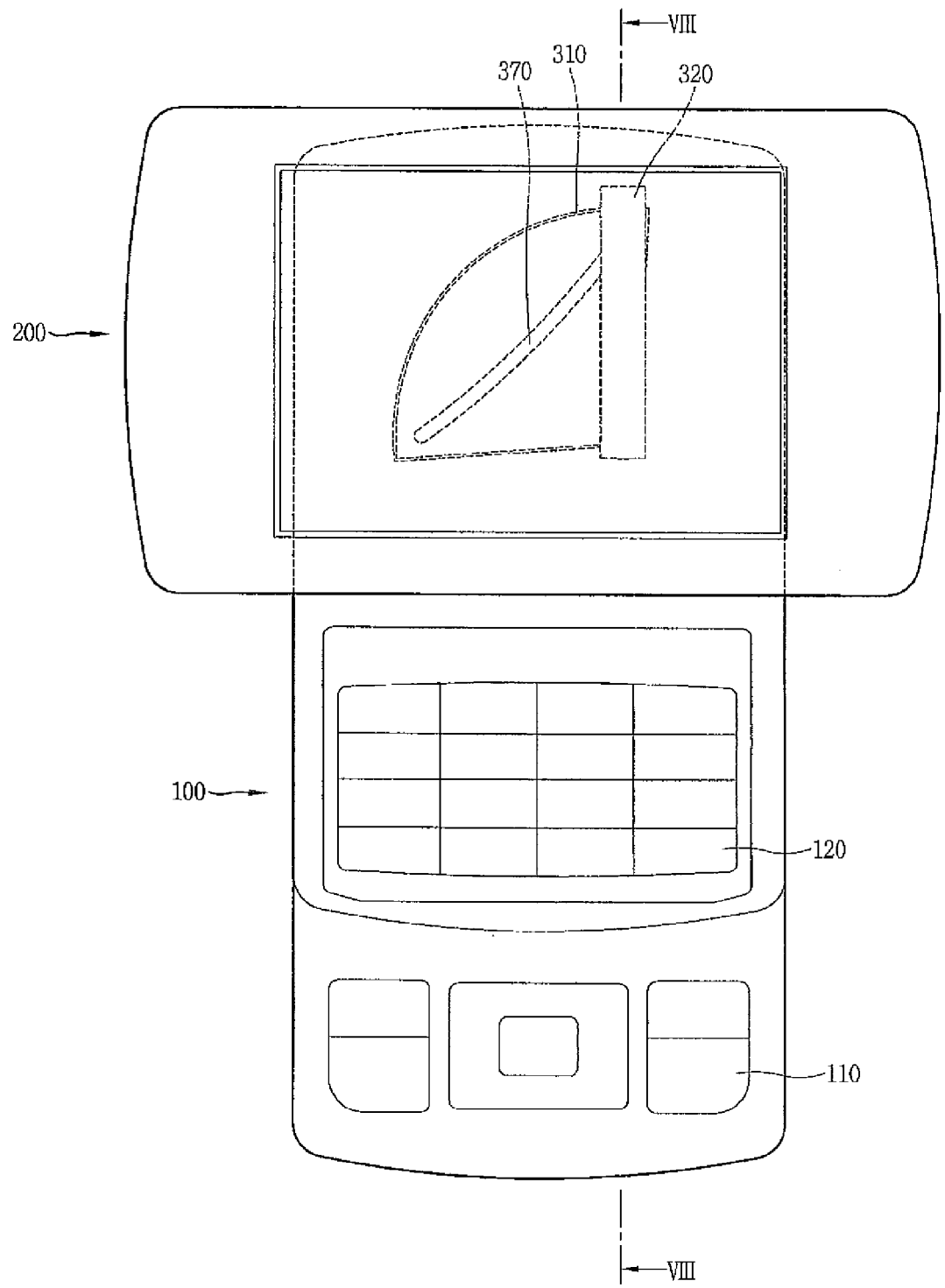
FIG. 7 is a schematic front view showing an opened state of the mobile terminal of FIG. 1.
Figure 8:
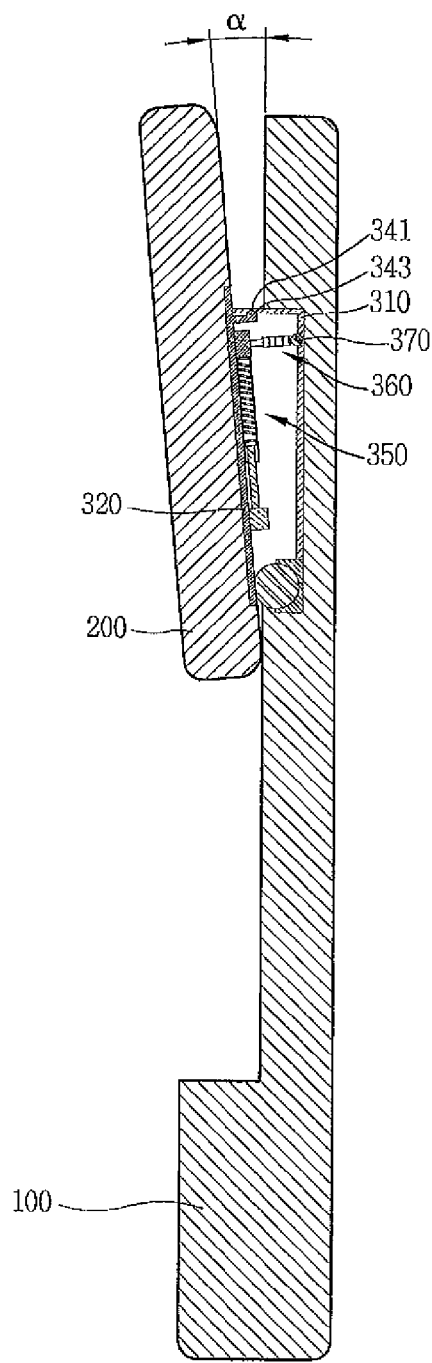
FIG. 8 is a sectional view taken along line VIII-VIII in FIG. 7.

The operation of the mobile terminal constructed as described above will now be described with respect to FIGS. 5-8. With the mobile terminal closed (FIGS. 5 and 6), the second hinge portion 320 is positioned in the horizontal position on the planar portion 311 and the first and second bodies 100 and 200 are positioned to face each other (i.e., to contact each other).

When the second body 200 is rotated with respect to the first body 100 in order to open the mobile terminal, the second hinge portion 320 is rotated in a state of contacting first the slide face 311 and then the slide face 312 of the first hinge portion 310. Specifically, first, while the second hinge portion 320 is rotated on the planar portion 311, the second body 200 is horizontally rotated relatively with respect to the first body 100, and while the second hinge portion 320 is rotated on the slope portion 312, a portion of the second body 200 is elevated (lifted) while being inclined with respect to the first body 100.

When the mobile terminal is completely opened (FIGS. 7 and 8), the second body 200 is in a substantially 90° rotated state with respect to the first body 100 and positioned to be inclined forwardly, providing the viewing angle (a) at which the user can conveniently watch an image.

In this manner, when the second hinge portion 320 is rotated with respect to the first hinge portion 310, the release preventing portion 340 acts such that the protrusion 343 formed at one end of the second hinge portion 320 is inserted in the release preventing rail 341 formed at one surface of the first hinge portion 310 to thus prevent the hinge module 300 from being released.

Also, the elastic unit 350 of the elastic force member, which is compressed when the transfer unit 360 is moved along the linearly formed guide rail 370, provides the restoration force to allow the second body 200 to be semi-automatically opened.

As so far described, the mobile terminal according to the present invention has many advantages. That is, because the body with the display unit is sloped at the tilt angle, the viewing angle at which the user can conveniently watch an image can be obtained, In addition, because the display unit is positioned semi-automatically at the tilt angle after being rotated to provide the horizontal screen image, no cradle is required for the mobile terminal. Thus, the portability of mobile terminal can be improved and the mobile terminal can be conveniently used.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a first body;
    a second body having a display unit and arranged to overlap the first body in a closed state; and
    a hinge module connecting the second body to the first body such that the second body is rotatable around a first axis generally perpendicular to the first body, the hinge module being configured to permit a portion of the second body to be elevated so as to be slantingly arranged with respect to the first body in an open state, the hinge module being configured to allow the portion of the second body to be elevated while the second body is partially rotated around the first axis, the hinge module including:
        a first hinge portion formed on one of a front surface of the first body and a rear surface of the second body, the first hinge portion including a slide face having a height that gradually increases so as to elevate the second body as the second body is rotated around the first axis from the closed state to the open state;
        a second hinge portion formed on the other of the front surface of the first body and the rear surface of the second body, the second hinge portion being in slidably movable contact with the slide face of the first hinge portion;
        a supporting portion connecting the first and second hinge portions; and
        a release preventing portion that prevents the first hinge portion from being released from the second hinge portion, the release preventing portion including:
            a release preventing rail having a groove formed at one surface of the first hinge portion; and
            a connecting portion mounted at one end of the second hinge portion, the connecting portion being received in the release preventing rail.

2. The mobile terminal of claim 1, wherein the slide face of the first hinge portion comprises a planar portion formed to be generally parallel to the first body, and a slope portion extending from the planar portion and having the gradually increasing height.

3. The mobile terminal of claim 1, wherein the first hinge portion is formed to have a fan-like shape.

4. The mobile terminal of claim 1, wherein the supporting portion includes:
    a supporting recess formed at one portion of one of the first hinge portion and the second hinge portion; and
    a supporting projection formed at the other of the first hinge portion and the second hinge portion, the supporting projection being received in the supporting recess.

5. The mobile terminal of claim 4, wherein the supporting recess is substantially hemispherical and the supporting projection is substantially spherical.

6. The mobile terminal of claim 1, wherein the connecting portion comprises:
    a body extending from one end of the second hinge portion; and
    a protrusion extending from the body, the protrusion being slidably inserted into the release preventing rail.

7. The mobile terminal of claim 6, wherein the hinge module includes an elastic force member that provides an elastic force to assist in the rotational movement of the second hinge portion from the closed state to the open state.

8. The mobile terminal of claim 7, wherein the elastic force member includes:
    an elastic unit located at one surface of the second hinge portion, the elastic unit being elastically extendable in a lengthwise direction of the second hinge portion;
    a transfer unit connected at one end of the elastic unit, the transfer unit being linearly moveable by being connected to the first hinge portion; and
    a guide rail recessed in one surface of the first hinge portion, the guide rail receiving the transfer unit therein to guide the transfer unit.

9. The mobile terminal of claim 8, wherein the elastic unit includes:
    a fixed member extending from the one surface of the second hinge portion;
    a first shaft extending from one side of the fixed member in a lengthwise direction of the second hinge portion;
    a first elastic member located at one end of the first shaft to provide an elastic force to the rotation of the second hinge portion; and a first guide member covering the first elastic member and configured to guide an elastic movement of the first elastic member.

10. The mobile terminal of claim 8, wherein the transfer unit includes:
   a second shaft extending toward the first hinge portion;
   a second guide member connected at an end of the second shaft distal to the second hinge portion, the guide member being displaceable along an axis defined by the second shaft as the second body is elevated; and
   a transfer member located at one end of the second guide member, the transfer member being at least partially received, in the guide rail.

11. The mobile terminal of claim 10, wherein the transfer unit further includes a second elastic member connected between the distal end of the second shaft and the transfer member.

12. The mobile terminal of claim 1, wherein the hinge module includes an elastic force member that provides an elastic force to assist in the rotational movement of the second hinge portion from the closed state to the open state.

13. The mobile terminal of claim 12, wherein the elastic force member includes:
   an elastic unit located at one surface of the second hinge portion, the elastic unit being elastically extendable in a lengthwise direction of the second hinge portion;
   a transfer unit connected at one end of the elastic unit, the transfer unit being linearly moveable by being connected to the first hinge portion; and
   a guide rail recessed in one surface of the first hinge portion, the guide rail receiving the transfer unit therein to guide the transfer unit.

14. The mobile terminal of claim 13, wherein the elastic unit includes:
   a fixed member extending from the one surface of the second hinge portion;
   a first shaft extending from one side of the fixed member in a lengthwise direction of the second hinge portion;
   a first elastic member located at one end of the first shaft to provide an elastic force to the rotation of the second hinge portion; and
   a first guide member covering the first elastic member and configured to guide an elastic movement of the first elastic member.

15. The mobile terminal of claim 13, wherein the transfer unit includes:
   a second shaft extending toward the first hinge portion;
   a second guide member connected at an end of the second shaft distal to the second hinge portion, the guide member being displaceable along an axis defined by the second shaft as the second body is elevated; and
   a transfer member located at one end of the second guide member, the transfer member being at least partially received in the guide rail.

16. The mobile terminal of claim 15, wherein the transfer unit further includes a second elastic member connected between the distal end of the second shaft and the transfer member.

* * * * *